United States Patent [19]

Katto et al.

[11] Patent Number: 4,613,654

[45] Date of Patent: Sep. 23, 1986

[54] POLYARYLENESULFIDE COMPLEXES, PROCESSES FOR PRODUCTION AND USES THEREOF

[75] Inventors: Takayuki Katto; Toshitaka Kouyama; Takao Iwasaki; Zenya Shiiki, all of Iwaki, Japan

[73] Assignee: Kureha Kagaku Kogyo Kabushiki Kaisha, Tokyo, Japan

[21] Appl. No.: 734,321

[22] Filed: May 15, 1985

[30] Foreign Application Priority Data

May 15, 1984 [JP] Japan .................................. 59-95705

[51] Int. Cl.$^4$ .......................................... C08F 283/00
[52] U.S. Cl. ..................................... 525/537; 528/388
[58] Field of Search .......................... 525/537; 528/388

[56] References Cited

U.S. PATENT DOCUMENTS

| 4,017,450 | 4/1977 | Bailey | 260/37 R |
| 4,071,509 | 1/1978 | Edmonds, Jr. | 528/388 |
| 4,373,091 | 2/1983 | Edmonds, Jr. | 528/481 |
| 4,393,197 | 7/1983 | Edmonds, Jr. | 528/388 |
| 4,405,745 | 9/1983 | Mathis et al. | 528/388 |

FOREIGN PATENT DOCUMENTS 0103279  3/1984  European Pat. Off. .
3143992  7/1982  Fed. Rep. of Germany .

OTHER PUBLICATIONS

Tabor et al., European Polymer Journal, vol. 7, pp. 1127–1133 (1971).

*Primary Examiner*—Melvyn I. Marquis
*Attorney, Agent, or Firm*—Wenderoth, Lind & Ponack

[57] ABSTRACT

Novel polyarylenesulfide complexes are obtained by reacting a polyarylenesulfide with 0.05 to 20 mols of at least one strongly basic metal compound per 100 mols of arylenesulfide groups contained in the polyarylenesulfide under a uniformly dispersed condition, and have the properties defined in the following (A) through (C):

(A) $\eta^*/\eta_0^* = 3$ to 100, wherein the $\eta^*$ and $\eta_0^*$ stand for melt viscosities of the complex and the starting polyarylenesulfide, respectively;

(B) $\Delta T_{c2} = (T_{c2})_0 - T_{c2} = 10$ to 100° C., wherein $T_{c2}$ and $(T_{c2})_0$ stand for crystallization temperatures of the complex and the starting polyarylenesulfide, respectively, observed when the polyarylenesulfide is cooled from its moten state; and (C) $\Delta(\Delta E) = \Delta E - (\Delta E)_0 = 5$ to 75 kcal/mol, wherein $\Delta E$ and $(\Delta E)_0$ stand for apparent flow activation energies of the complex and the starting polyarylenesulfide, respectively.

The polyarylenesulfide complexes have higher melt viscosity with improved flow characteristics.

4 Claims, No Drawings

POLYARYLENESULFIDE COMPLEXES, PROCESSES FOR PRODUCTION AND USES THEREOF

BACKGROUND OF THE INVENTION

1. Field of the Art

This invention relates to polyarylenesulfide (hereinafter referred to as PAS) complexes, processes for production thereof, and uses thereof.

Of PAS resins, poly-p-phenylenesulfide (hereinafter referred to as PPS) is characterized by excellent properties such as resistance to heat and chemicals, mechanical properties, and fire resistance, and has been broadly used in the field of injection molded articles, etc.

It is not easy, however, to obtain the PPS polymer having a high molecular weight or a high melt viscosity, by simple polymerization steps for production thereof.

The PPS having low melt viscosity has been widely used for injection molding. The PPS having high melt viscosity is needed in the case of high-impact or thick molded articles. Moreover, in the field of extruded products which are also important and especially in the field of sheets and films, PPS having high melt viscosity is needed from the viewpoint of processability and properties of formed products.

2. Prior Art

A variety of research has been conducted to obtain PPS of high melt viscosity on such backgrounds. For example, the following methods have heretofore been known: (1) a method for increasing the molecular weight of PPS by conducting the polymerization reaction of paradichlorobenzene with sodium sulfide in N-methylpyrrolidone (hereinafter referred to as NMP) in the presence of sodium acetate or lithium acetate (Japanese Patent Publication No. 12240/1977); (2) a method wherein a multifunctional crosslinking agent such as trichlorobenzene is used in the polymerization (Japanese Laid-open Patent Application No. 136100/1978); and (3) a method for increasing melt viscosity by heat-treating PPS powder at a high temperature in the presence of oxygen (Japanese Patent Publication No. 30609/1977, Japanese Laid-open Patent Application No. 119926/1982), etc.

As far as known by the present inventors, however, all these methods have some problems. In the method (1), there is a limit of increasing the melt viscosity. The melt viscosity will not reach a level high enough for obtaining sheets, films and the like having good properties. Moreover, the method entails a problem due to the use of such a lot of costly salts such as lithium salts that the salts should be recovered from the waste water. In the method (2), PPS of high viscosity can be obtained by the use of a large amount of crosslinking agents. The resulting PPS, however, has no linearity and results in brittle products having little elongation. When it is formed into yarns or films, the processing is difficult because of poor spinnability or stretching property. The resulting products fail to have good properties even when they are obtained. Also in the method (3), PPS of high viscosity can be obtained with sufficient treatment at a high temperature (e.g. 200° C. or higher). It is difficult to conduct uniform reaction, whereby locally overheated portions are often formed. Such non-uniform treatment causes fish eyes and uneven molecular orientation in the case of films, and also uneven stretching, nonuniform thickness, slabbing, breaking and the like in the case of yarns or filaments. Moreover, such treated PPS has problems such as poor spinnability and stretching property as in the resin treated by the above mentioned method (2), because the method (3) may also crosslink the PPS.

On the other hand, it is also known to produce compositions for enhancing the mechanical properties of PAS by adding to PAS the powder, particles, fibers or the like of inorganic compounds, metal compounds, etc. such as alumina, silica, titanium compounds, glass and graphite. These additives, however, are inert compounds and have no chemical interaction with PAS. Thus, the melt viscosity of PAS could not be enhanced by addition of these additives.

Moreover, Japanese Laid-open Patent Application No. 78257/1984 Specification discloses a method for affecting crystallization of PAS by treating PAS at an elevated temperature in an aqueous solution of calcium oxide or the like. It is difficult, however, to markedly enhance the melt viscosity of PAS.

SUMMARY OF THE INVENTION

The principal object of the present invention is to solve the above mentioned problems by the use of novel resin materials derived from PAS.

Thus, the polyarylenesulfide complexes of the present invention, obtained by reacting a polyarylenesulfide with 0.05 to 20 mols of at least one strongly basic metal compound per 100 mols of arylenesulfide groups contained in the polyarylenesulfide under a uniformly dispersed condition, are characterized by the properties defined in the following (A) through (C):

(A) $\eta^*/\eta_0^* = 3$ to 100, wherein the $\eta^*$ and $\eta_0^*$ stand for melt viscosities of the complex and the starting polyarylenesulfide, respectively;

(B) $\Delta T_{c2} = (T_{c2})_0 - T_{c2} = 10°$ to $100°$ C., wherein $T_{c2}$ and $(T_{c2})_0$ stand for crystallization temperatures of the complex and the starting polyarylenesulfide, respectively, observed when the polyarylenesulfide is cooled from its molten state; and (C) $\Delta(\Delta E) = \Delta E - (\Delta E)_0 = 5$ to 75 kcal/mol, wherein $\Delta E$ and $(\Delta E)_0$ stand for apparent flow activation energies of the complex and the starting polyarylenesulfide, respectively.

The process for production of the present polyarylenesulfide having the properties defined in the following (A) through (C) is characterized by reacting a polyarylenesulfide with 0.05 to 20 mols of at least one strongly basic metal compound per 100 mols of arylenesulfide groups contained in the polyarylenesulfide under a uniformly dispersed condition:

(A) $\eta^*/\eta_0^* = 3$ to 100, wherein the $\eta^*$ and $\eta_0^*$ stand for melt viscosities of the complex and the starting polyarylenesulfide, respectively;

(B) $\Delta T_{c2} = (T_{c2})_0 - T_{c2} = 10°$ to $100°$ C., wherein $T_{c2}$ and $(T_{c2})_0$ stand for crystallization temperatures of the complex and the starting polyarylenesulfide, respectively, observed when the polyarylenesulfide is cooled from its molten state; and (C) $\Delta(\Delta E) = \Delta E - (\Delta E)_0 = 5$ to 75 kcal/mol, wherein $\Delta E$ and $(\Delta E)_0$ stand for apparent flow activation energies of the complex and the starting polyarylenesulfide, respectively.

This invention also relates to formed products of the polyarylenesulfides.

As mentioned above, the novel resin materials according to the present invention, which are derived from PAS, have markedly high melt viscosity in comparison with the original PAS. In this respect, the main problems in the prior art have been solved. Besides, the present novel resin materials are provided with the following advantages which are directly or indirectly due to the above mentioned properties.

(1) Advantages on Processability (i) Melt viscosity can be controlled substantially as desired. As a result, the present complex can, even when it has been produced from a low-molecular PAS which is difficult to process as it is, be readily processed into film, sheeting, filament, etc.

(ii) Excellent Spinnability or Orientation Property

The present resin materials have a large difference between the melting point (Tm) (similar to that of the starting PAS) and the "higher" crystallization temperature ($T_{c2}$) observed when the PAS is cooled from its molten state; and filaments or films containing less spherulites can be obtained upon melt spinning and melt extrusion, because there is sufficient time between melt processing and spherulite formation or solidification. Thus, less breaking takes place upon spinning, sheets and films can be readily wound up, and also the subsequent orienting steps can be uniformly carried out.

(iii) Although the melt viscosity $\eta^*$ is very high, the apparent activation energy ($\Delta E$) of flow is large, that is, the temperature dependency of the melt viscosity is high. Thus, the melt extrusion is conducted smoothly, and extrusion into plates, pipes, profiles, etc. that need shape retention can be readily carried out.

(2) Advantages on Solid Properties (i) The products in accordance with the present invention are excellent in transparency, color tone (colorless to slight color) and surface smoothness, and also have less fish eyes. Such color properties are important merits in appearance of the present resin materials, whereas the conventional PAS heated to increase its melt viscosity is colored black or brown. Thus, it is also advantageous to modify the present materials with coloring agents.

(ii) The resin materials are excellent in processability, moldability and stretching properties. As a result, the processed products (sheets, films, yarns, etc.) have less defects and are excellent in mechanical properties.

(iii) The present resin materials do not make a large difference with the conventional PAS with respect to the melting temperature (Tm) of crystals and glass transition temperature (Tg) as well as electric properties such as specific volume resistance ($\rho v$) and dielectric loss (tan $\delta$). Thus, they can be handled in this respect in the same way as the PAS.

(3) Advantages on the Production

The starting PAS to be used for the present novel resin materials are not needed to be special one, but an ordinary one. The resin materials can be produced by a ready process wherein reaction is carried out by uniformly dispersing a strongly basic metal compound in the PAS.

DETAILED DESCRIPTION OF THE INVENTION

Novel Resin Materials

Chemical Entity (I)

The present novel resin materials are obtained by reacting PAS (explained below in detail) with 0.05 to 20 mols of a strongly basic metal compound (explained below in detail) per 100 mols of arylenesulfide groups comprised in the PAS under a uniformly dispersed condition. The direct demonstration of the chemical entity on structural chemistry, however, cannot be completely conducted with the current structural analysis techniques.

It is considered, however, that the characteristics of the present resin materials as given below are enough to distinguish the present resin material from the PAS as chemically different materials. The resin materials have been obtained on the basis of unexpected findings that the melt viscosity of the PAS obtained by post-treatment with a strongly acidic solution and drying is markedly different from that of the PAS obtained by post-treatment with a strongly alkaline solution and drying. Also, it has been observed that the melt viscosity of the acid-treated PAS approaches that of the alkali-treated PAS when the acid-treated PAS is further treated with an alkali, and that the melt viscosity of the alkali-treated PAS approaches that of the acid-treated PAS when the alkali-treated PAS is further treated with an acid. In view of these findings, it is reasonably considered that the resin materials are composed of a complex of the PAS with the strongly basic metal compound rather than a compound of the PAS with the metal compound through covalent bonding.

Thus, the present resin materials are herein referred to as PAS complexes. As mentioned above, however, the analysis of the resin materials on structural chemistry has not been fully made. The present resin materials should be defined herein by their components (PAS and strongly basic metal compound) and their physical and chemical characteristics.

General Characteristics

The physical-chemical characteristics of the present PAS complexes are shown below in comparison with the original PAS from which it has been derived.

(1) The melt viscosity of PAS is increased 3 to 100 times (normally 3 to 50 times), when the PAS is treated with a strongly basic metal compound.

(2) When PAS is treated with a strongly basic metal compound, its crystallization temperature $T_{c2}$ obtained when PAS is cooled from its molten state is lowered largely (i.e. by 10° to 100° C.).

(3) When PAS is treated with a strongly basic metal compound, the apparent activation energy of flow ($\Delta E$) is increased largely (i.e. by 5 to 75 kcal/mol). Namely, the dependency of the melt viscosity on temperature is remarkably larger than that of the original PAS. Incidentally, an ionomer (i.e. polyethylene ion complex) also exhibits the large dependency of melt viscosity on temperature.

(4) When PAS is treated with a strongly basic metal compound, an exothermic heat (considered as neutralization heat) is observed in its molten state region.

(5) The spectra of the S atoms of the present PAS complex in ESCA measurement and of the PAS complex in $^{13}C$ solid NMR measurement exhibit clear changes in comparison with those of the original PAS.

(6) The non-crystalline film produced from the present PAS complex, which has been obtained by reacting PAS with a strongly basic alkaline metal compound under a uniformly dispersed condition, does not make a large difference in transparency with the film produced from the starting PAS. It is considered that the transparency is due to the dispersion of the metal compound in the order of molecules or ions. Incidentally, such transparency is readily lost when a small amount of inert solid such as NaCl and KBr is incorporated into the PAS.

(7) The electric properties such as specific volume resistance ($\rho v$) and dielectric loss (tan $\delta$) of the present complex do not make a large difference with those of the starting material PAS. Incidentally, the $\rho v$ is largely decreased and the tan $\delta$ is largely increased when a small amount of an inert ionic material is admixed with the PAS.

The melt viscosity is determined with a Koka type flow tester under the condition of 310° C. and a shear velocity of 200 per second, wherein a nozzle 0.5 mm in diameter/10 mm in length is used when melt viscosity is 10,000 poise or less and a nozzle 1.0 mm in diameter/10 mm in length when over 10,000 poise.

The crystallization temperature, melting point (Tm) and glass transition temperature (Tg) are determined, with a differential scanning calorimeter (DSC, supplied from Shimadzu Seisakusho, Japan), by measuring 10 mg of samples (prepared by melt-pressing pellets at 320° C. and rapidly cooling the resulting sheet) in nitrogen atmosphere at an elevation/depression temperature speed of 10° C./minute. The crystallization temperature, melting point and glass transition temperatures correspond to a temperature showing a crystallization peak, a temperature showing a melting peak, and a temperature showing an endothermic start, respectively. Incidentally, a "lower" crystallization temperature $T_{c1}$ is the crystallization temperature observed when a crystalline resin which turns amorphous by rapid cooling is then heated. A "higher" crystallization temperature $T_{c2}$ is the crystallization temperature observed when a molten resin is cooled from its molten state.

The apparent activation energy of flow ($\Delta E$) is determined by measuring melt viscosities at several temperatures between 300° and 350° C. and plotting them on semilogarithmic graph paper with the melt viscosity on the vertical axis and 1/T horizontally. The activation energy is calculated from the slope of the resulting straight line on the basis of the expression "melt viscosity $= Ae^{\Delta E/RT}$".

Chemical Entity (II)

The novel resin materials of the present invention are obtained, as described above, by reacting PAS with a strongly basic metal compound.

(1) PAS

The PAS to be used in the present invention is a homopolymer or copolymer having the repeating units of the formula $\text{+Ar—S+}$ as its main structural unit. The PAS can contain a small amount of branches or crosslinking represented by

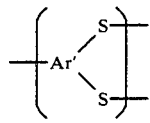

and the like, as far as the PAS has the above mentioned repeating units as its main structural unit.

The Ar is represented by, for example,

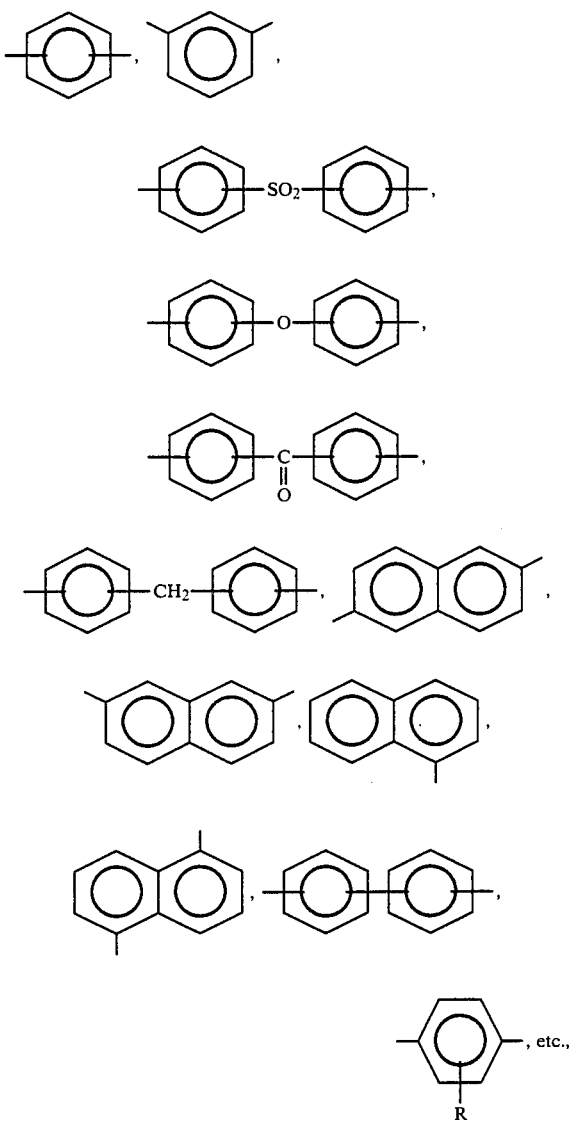

wherein R is an alkyl or alkoxyl group, especially those of $C_1$ to about $C_4$. The Ar' is represented by

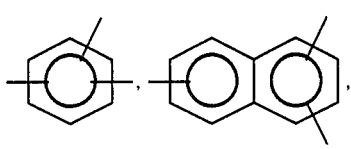

The for Ar is preferred to be

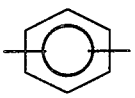

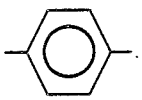

An especially preferable PAS is represented by PPS containing 90 mol % or more of p-phenylenesulfide unit

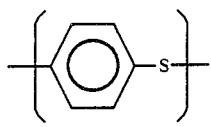

as the main structural unit of the polymer. The PPS may contain less than 10 molar % of other copolymerizable structural units, which are exemplified by metaphenylenesulfide unit 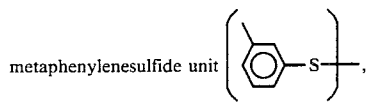, diphenylketone sulfide unit 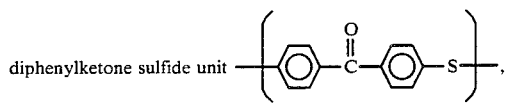, diphenylsulfonesulfide unit 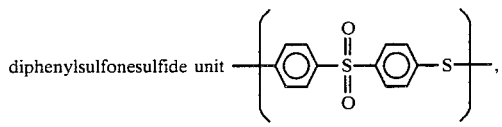, diphenylethersulfide unit 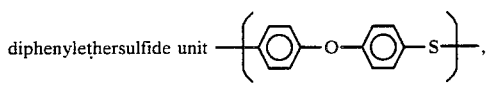, biphenylsulfide unit 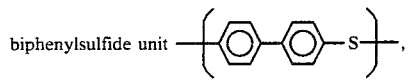, 2,6-naphthalenesulfide unit 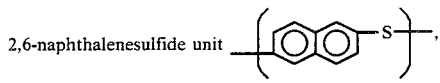, trifunctional unit 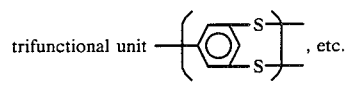, etc.

The trifunctional unit is desirably 1 molar % or less.

Such PAS to be used in the present invention can be synthesized by conventional processes. For example, a process is disclosed in U.S. Pat. No. 3,354,129 Specification, which comprises reacting p-dichlorobenzene with sodium sulfide in N-methylpyrrolidone (NMP) to produce PPS. Also, a process described in Japanese Patent Publication No. 12240/1977 is suitable to obtain high-molecular PPS, which comprises reacting dichlorobenzene with sodium sulfide in NMP in the presence of an alkali metal salt of an organic acid such as lithium acetate or sodium acetate. Other methods used to obtain a higher molecular weight PAS can also be employed, which are exemplified by the above mentioned polymerization reaction in NMP in the presence of an inorganic salt such as lithium carbonate or calcium hydroxide.

(2) Strongly Basic Metal Compounds

As the strongly basic metal compound constituting the other component of the present resin materials, preferably there can be used at least one of the metal compounds selected from the group consisting of hydroxides, oxides and hydrocarbyloxides of an alkali metal or an alkaline earth metal. The carbonates of an alkali metal or an alkaline earth metal can also be used.

Examples of such strongly basic metal compounds include (a) hydroxides such as sodium hydroxide, potassium hydroxide, lithium hydroxide, calcium hydroxide and barium hydroxide; (b) oxides such as barium oxide and calcium oxide; (c) hydrocarbyloxides; e.g. alkoxides such as sodium methoxide, sodium ethoxide, magnesium ethoxide, magnesium methoxide and potassium ethoxide, as well as alkali metal salts of hydroxyl-substituted aryl or aralkyl compounds (e.g. phenol or naphthol) such as sodium phenoxide and sodium naphthoxide, etc. The alkyl group or alkyl moiety in the above mentioned hydrocarbyl group is typically a lower alkyl group. The aryl group or aryl moiety in the hydrocarbyl group is typically a phenyl or naphthyl group. The term "aryl group" encompasses an alkaryl group. These strongly basic metal compounds to be used may contain water of crystallization.

Of these metal compounds, especially hydroxides, oxides, alkoxides and phenoxides are very effective in giving the resulting complex high melt viscosity in a small quantity thereof.

These strongly basic metal compounds are compatible with PAS, and most of the rapidly cooled sheets of the molten mixtures thereof are transparent.

(3) Molar Ratio

The quantity of the strongly basic metal compounds to be reacted with PAS is 0.05 to 20 mols per 100 mols of arylenesulfide groups contained in the PAS. The effect due to the complex is lowered when the metal compound is less than 0.05 mol. When it is more than 20 mols, an unreacted metal compound remains because of incomplete reaction and the properties of the resulting complex are deteriorated. More preferably, the quantity is 0.05 to 10 mols.

Production of the Novel Resin Materials

The present PAS complex can be readily obtained by reacting the starting material PAS with 0.05 to 20 mols of at least one strongly basic metal compound per 100 mols of arylenesulfide groups contained in the PAS under a uniform condition. The reaction of PAS with the strongly basic metal compound under a uniform condition means that the PAS exists in the state of melting or solution and the strongly basic metal compound is uniformly dispersed therein to cause the reaction.

Specific processes for production include a process for reacting a PAS solution with a strongly basic metal compound uniformly dispersed therein, and a process for reacting molten PAS with a strongly basic metal compound uniformly dispersed therein.

(1) The process for reacting a PAS solution with the metal compound comprises dissolving PAS uniformly at an elevated temperature and reacting it with the metal compound added thereto to form a PAS complex.

The solvents to be used include, for example, an amide (e.g. N-methylpyrrolidone), a phosphonamide (e.g. hexamethylphosphoric amide), a sulfone (e.g. sulfolane) a urea derivative (e.g. tetramethyl urea), an aryl or aralkyl hydrocarbon (e.g. biphenyl), an ether (e.g. biphenyl ether, polyethyleneoxide alkyl ether), an aryl or aralkyl hydrocarbon halide (e.g. chloronaphthalene), a pyridine or quinoline derivative (e.g. quinoline), a ketone (e.g. methylcyclohexanone), etc. As necessary, mixtures of these solvents can be used.

A temperature for dissolution is generally high, and needs a temperature of 200° C. or more for satisfactory dissolution. A temperature of 300° C. or more is not desirable because of decomposition of the solvent.

Also, the strongly basic metal compounds should be in such form as to be dispersed uniformly in the PAS solution. For example, the reaction can be carried out by dissolving the metal compound such as alkoxides in an alcohol, adding the solution to the PAS solution, and stirring or shaking the mixture for about 1 minute to about 100 hours. The metal compounds such as hydroxides, oxides and carbonates are dissolved in a small amount of water or pulverized into fine particles, and then incorporated into the PAS solution, because it is difficult to dissolve them in an organic solvent. Reaction can be carried out by stirring or shaking the resulting mixture for about 1 minute to about 100 hours.

After the reaction, the reaction mixture is cooled and the solvent is removed by means of filtration or the like. The reaction mixture is then treated, without neutralization with an acid, by repeated washing and filtration and dewatering, followed by drying at 50° C. to a melting point thereof. Thus, a PAS complex according to the present invention can be obtained.

The process for treating the PAS in a solution state can also be carried out following a synthetic reaction for producing PAS, by adding a strongly basic metal compound in the last course of or after termination of the synthetic reaction in a solution state for producing PAS.

(2) The process for reacting PAS in a molten state with a strongly basic metal compound comprises heating PAS to a temperature of its melting point (normally 250° C. or higher) to 400° C. to melt it and dispersing under mixing the solid metal compound in the PAS maintained in the molten state to conduct the reaction. The reaction remains incomplete when the temperature is lower than the melting point, and the PAS is caused to decompose when the temperature is over 400° C. According to this process, the reaction can be carried out for 1 minute to 10 hours by kneading under melting a blend mixture of PAS in the form of powder or pellets and the metal compound in the form of solid or preferably powder, by means of a melt extruder, a brabender, heat rollers, etc. Thus, it is advantageous that the reaction can be readily carried out in comparison with the reaction in a solution state. In this process, a low-melting metal compound such as alkoxides, hydroxides containing a large amount of water of crystallization is readily melted and well dispersed in PAS. Such low-melting metal compounds are most efficient according to this process. It is desirable that non-melting metal compounds such as hydroxides are pulverized into particles as fine as possible and kneaded with PAS.

Uses of the Novel Resin Materials

The present PAS complexes can be used as resin materials having the above mentioned characteristics for producing a variety of molded products.

For example, the present PAS complex can be melt-extruded at a temperature of Tm to 400° C. into sheeting and then crystallized under heating at a temperature of $T_{c1}$ to Tm to make tough heat-resistant sheet. Also, the melt-extruded sheets can be stretched 2 to 20 times in an area ratio monoaxially or biaxially at a temperature of Tg to $T_{c1}$, and the resulting stretched films can be crystallized under heating at a temperature of $T_{c1}$ to Tm. Thus, there can be obtained tough heat-resistant films having excellent surface smoothness and less defects.

On the other hand, the present PAS complex can be spun by means of melt extrusion from a nozzle at a temperature of Tm or more and winding up, and then stretched 2 to 20 times of the original length into oriented filaments, followed by recrystallization under heating at a temperature of $T_{c1}$ to Tm. Thus, high-strength heat-resistant yarns can be obtained.

The present PAS complex is enhanced in its melt viscosity and has good shape retention when it is melt-processed. Thus, heat-resistant extruded products such as pipes, plates and profiles having toughness as well as resistance to oil and chemicals can be obtained by melt extrusion thereof at a temperature of Tm to 400° C.

Also, the present PAS complex, which has good electric properties, can be melt-extruded at a temperature of its melting point to 400° C. by means of a cross-head die. Thus, there can be obtained heat-resistant covered electric wires having toughness and less insulating defects.

The present PAS complex can be melted in an injection molding machine at a temperature of its melting point to 400° C. and injected into a mold kept at a temperature lower than $T_{c2}$ to obtain injection molded products. The injection molded products obtained from the present PAS complex have less strains, because the spherulites formed at annealing are minute. Thus, heat-resistant molded products having less defects such as cracks can be obtained even in the case of thick molded products.

Because the present PAS complexes fall under thermoplastic polymers, a variety of modifications applicable to thermoplastic polymers can be made. For example, the present complex polymers can be used by incorporating therein powder fillers such as carbon black, silica powder and titanium oxide powder or fibrous fillers such as carbon fibers, glass fibers, asbestoes and polyaramide fibers. The complex polymers can also be used by blending with one or more synthetic resins such as polycarbonates, polyphenyleneoxides, polysulfones, polyarylenes, polyacetals, polyimides, polyamides, polyesters, polystyrene, and ABS.

EXPERIMENTS

Examples 1 through 3 and Comparative Examples 1 through 4

$\Delta E$ and various transition points of the resulting pellets were measured. The results are shown in Table 1-1.

The starting PAS used in Examples 1 through 3 corresponds to the PAS of Comp. Example 1.

TABLE 1-1

| | Metal Compounds | | | *2 | *2 | Transition points | | | | $\Delta T_{c2}$ | $\Delta E$ | $\Delta(\Delta E)$ |
|---|---|---|---|---|---|---|---|---|---|---|---|---|
| | types | parts by weight | mol*[1] | $\eta^*$ (poise) | $\eta^*/\eta_0^*$ | Tg | $T_{c1}$ | Tm | $T_{c2}$ | (°C.) | (kcal/mol) | (kcal/mol) |
| Exam. 1 | NaOCH₃ | 0.5 | 1.0 | 11000 | 6.7 | 91 | 138 | 277 | 227 | 22 | 19 | 13 |
| Exam. 2 | NaOCH₃ | 1.0 | 2.0 | 14500 | 8.8 | 88 | 138 | 275 | 224 | 25 | 25 | 19 |
| Exam. 3 | NaOCH₃ | 2.0 | 4.0 | 17000 | 10.3 | 90 | 142 | 270 | 210 | 39 | 28 | 22 |
| Comp. Exam. 1 | — | — | — | 1650 | 1.0 | 86 | 122 | 282 | 249 | — | 6 | 0 |
| Comp. Exam. 2 | NaCl | 0.2 | 0.36 | 1700 | 1.0 | 90 | 124 | 282 | 242 | 7 | 6 | 0 |
| Comp. Exam. 3 | NaCl | 2.0 | 3.6 | 1750 | 1.1 | — | — | — | — | — | — | — |
| Comp. Exam. 4 | heating with no alkali | — | — | 14400 | 8.7 | 92 | 128 | 278 | 237 | 9 | 7 | 1 |

*[1]The value is expressed by the molar amount of the metal ions of said compound added to the PPS to react with 100 mols of sulfide groups in PPS. (This is also applied to the following tables.)

*[2]$\eta^*$ and $\eta_0^*$ show melt viscosities after the treatment and before the treatment, respectively.

Syntheses

In an autoclave equipped with a thermometer and a stirrer were charged 45 kg of NMP, 4.960 kg of CaO and 5.680 kg of Na₂S.3H₂O. After replacing with N₂, the mixture in the autoclave was heated to 250° C. with stirring and maintained at this temperature for 30 minutes (thereby, CaO reacts with H₂O in the reaction system to reduce free water contained in the system). Then, after cooling to 70° C., 6.492 kg of p-dichlorobenzene (hereinafter referred to as PDCB) was added to the system. After replacing with N₂, the system was heated to 205° C. and subjected to reaction for 70 hours. After cooling, the reaction system was filtered and the solid contents were placed in acetone and washed under stirring. The resulting solid was placed in water to make a slurry, and washing and dehydration were repeated to remove NaCl therefrom. Thereafter, the solid was repeatedly washed with aqueous HCl to remove Ca(OH)₂ therefrom. After repeating water-washing again, the solid was dried at 80° C. The yield of the resulting PPS powder (specific surface area 260 m²/g) was about 94% (Comp. Example 1).

The resulting polymer was powder-blended with NaOCH₃ in a ratio of 0.5 part by weight (Example 1), 1.0 part by weight (Example 2) or 2.0 parts by weight (Example 3) of NaOCH₃ per 100 parts by weight of the PPS and the resulting blend was extruded twice by means of a small extruder. Total residence time was about 12 min. The temperature of the resin during the extrusion was 340° C. The melt viscosities and various transition points of the resulting extruded pellets are shown in Table 1-1.

As comparative examples, the slurry which had been washed with the aqueous HCl and then repeatedly washed with water as mentioned above was filtered to give wet cake, and the cake was incorporated with an aqueous solution containing 0.2 part by weight of NaCl per an amount of the polymer, sufficiently shaken to blend uniformly with each other and dried (Comp. Example 2). In a similar manner, was prepared a polymer containing 2 parts by weight of NaCl (Comp. Example 3). Also, heat-treated PPS powder which was enhanced in melt viscosity ($\eta^*$) by heat-treating the PPS powder containing no additives at 255° C. for 20 hours was prepared (Comp. Example 4). Each PAS of the comparative examples was similarly extruded into pellets by means of a small extruder. The melt viscosity,

Processing (1)

The following treatment was carried out by using the sample each of Examples 1 and 2 as well as Comp. Examples 1 through 4.

(a) A pressed sheet was produced by heating a sample at 320° C. under pressing to form a sheet and then putting the sheet in cold water to quench it.

(b) The quenched pressed sheet was subjected to simultaneous biaxial orientation in a stretching ratio of 3.3×3.3 by means of a small biaxial stretching machine supplied by Long Company to give a stretched film. The stretching speed was 10%/sec. Then the resulting stretched film was subjected to heat treatment under tension at 260° C. for 10 minutes.

In Table 1-2 are shown the appearance (transparency, coloring and uniformity), mechanical properties and electrical properties of the resulting pressed sheets and stretched films. The strength, elongation and Young's modulus of the films were measured at 23° C. by using a Tensilon tester manufactured by Toyo Seiki Company, Japan. Measurements of the strength and elongation were conducted under an extension speed of 100%/min., while measurement of the Young's modulus was under an extension speed of 10%/min. Measurements of the dielectric constant and the dielectric loss tangent (tan δ) of the films were carried out under the conditions of 20° C./23% R.H./120 Hz.

Transparency was shown by transmittance of parallel rays (Tp) penetrating through a sample of a pressed sheet of about 0.1 mm thick (a quenched product) measured by using light-scattering photometer type TC-3 supplied by Tokyo Denshoku Co., Ltd., Japan.

As shown from Table 1-2, the PPS's in Comp. Examples 1 through 3 provide only a film having low melt viscosity and low uniformity; such film exhibited insufficient strength and elongation. In Comparative Example 4 wherein the melt viscosity of PPS was increased by the heat-treatment, the resulting film was heavily colored to provide only a brown-colored film although the strength and elongation thereof were increased. The film according to the present invention did not show a large difference from that of Comp. Example 1 with respect to specific volume resistance, dielectric constant and dielectric loss tangent despite of the fact that the film of the invention contained a metal compound. On the contrary, it was found that the films of Comp. Examples 2 and 3 were markedly decreased in specific volume resistance.

Processing (2)

The sample each of Examples 1 and 2 and Comp. Example 4 was spun into filaments by using a melt tension tester supplied by Toyo Seiki, Japan, through a nozzle of 1 mm (diameter)×5 mm (length) at 320° C. with a plunger velocity of 4 mm/min. and a winding velocity of 4 mm/min. The stretching ratios of the filaments obtained from a stretching test conducted in an oil-bath at 95° C. are shown in Table 1-2. The stretching ratio is indicated by a maximum stretching ratio of ten filaments neither of which are broken under simultaneous stretching of the ten filaments.

It can be seen that it is difficult to sufficiently stretch the filament of Comp. Example 4 although it has a large melt viscosity, while the filaments according to the present invention can be readily stretched to show a large drawing ratio.

Examples 4 through 12 and Comparative Examples 5 through 7

The procedure of Example 1 was repeated except that 5.512 kg of CaO and 5.665 kg of $Na_2S.3H_2O$ were used to give PPS powder (specific surface area 310 $m^2/g$). The yield obtained was about 92%. The polymer powder, 100 parts by weight, was blended with various kinds of metal compounds, respectively, and extruded into pellets by means of a small extruder as in Example 1. The melt viscosity, transition points determined by DSC and Tp are shown in Table 2.

Incidentally, the starting PAS in Examples 4 through 12 corresponds to the PAS in Comp. Example 5.

It can be seen from Table 2 that, in the case where an oxide used is not a strong base, such as $Al_2O_3$, a complex having the characteristics according to the present invention cannot be obtained and that Tp is low.

TABLE 2

| | Metal compounds | | | $\eta^*$ | | | (°C.) | | | | $\Delta E$ | $\Delta(\Delta E)$ | |
|---|---|---|---|---|---|---|---|---|---|---|---|---|---|
| | types | parts by wt. | mol | (poise) | $\eta^*/\eta_0^*$ | $T_g$ | $T_{c1}$ | $T_m$ | $T_{c2}$ | $\Delta T_{c2}$ | kcal/mol | kcal/mol | Tp % |
| Exam. 4 | $Ba(OH)_2.8H_2O$ | 0.5 | 0.17 | 7200 | 3.4 | 91 | 139 | 280 | 218 | 29 | 21 | 14 | 70 |
| Exam. 5 | " | 1.0 | 0.34 | 11600 | 5.5 | 93 | 141 | 277 | 215 | 32 | 24 | 17 | 63 |
| Exam. 6 | " | 2.0 | 0.68 | 29200 | 14.0 | 96 | 144 | 278 | 199 | 48 | 32 | 25 | 55 |
| Exam. 7 | $NaOCH_3$ | 0.25 | 0.5 | 6300 | 3.0 | 90 | 135 | 278 | 226 | 21 | 18 | 11 | 80 |
| Exam. 8 | " | 2.0 | 4.0 | 37500 | 17.9 | 90 | 140 | 278 | 214 | 33 | 29 | 22 | 73 |
| Exam. 9 | $Ca(OH)_2$ | 0.5 | 0.73 | 7850 | 3.7 | 93 | 134 | 278 | 232 | 15 | 17 | 10 | 73 |
| Exam. 10 | " | 1.0 | 1.5 | 9400 | 4.5 | 93 | 136 | 278 | 226 | 21 | 24 | 17 | 64 |
| Exam. 11 | $NaOC_2H_5$ | 1.0 | 1.9 | 13500 | 6.4 | 90 | 140 | 277 | 217 | 30 | 29 | 22 | 77 |
| Exam. 12 | " | 2.0 | 3.8 | 47700 | 22.7 | 93 | 145 | 269 | 188 | 59 | 33 | 26 | 73 |
| Comp. Exam. 5 | — | 0 | — | 2100 | 1.0 | 85 | 118 | 278 | 247 | 0 | 7 | 0 | 82 |
| Comp. Exam. 6 | $Al_2O_3$ | 1.0 | — | 2200 | 1.0 | 90 | 122 | 278 | 248 | −1 | 8 | 1 | 32 |
| Comp. Exam. 7 | " | 2.0 | — | 2000 | 1.0 | 92 | 124 | 278 | 245 | 2 | 6 | −1 | 11 |

Examples 13 through 18 and Comparative Examples 8 through 10

The procedure of Example 1 was repeated except that 5.512 kg of CaO was used to give PPS powder (specific surface area 180 $m^2/g$). The resulting polymer powder 100 parts by weight was blended as it is with various types of metal compounds, respectively, and each powder blend was extruded into pellets by means of a small extruder as in Example 1. The value $\eta^*$ and other properties of these pellets are shown in Table 3.

The starting PAS in Examples 13 through 18 corresponds to the PAS of Comp. Example 8.

TABLE 1-2

| | | Quenched pressed sheets | | Film | | | |
|---|---|---|---|---|---|---|---|
| Sample No. | $\eta^*$ (poise) | Transparency Tp (%) | Coloring | Stretching Temp. (°C.) | Appearance of films | | |
| | | | | | Transparency | Color | Uniformity |
| Example-1 | 11000 | 76 | slight yellow | 100 | good | no | good |
| Example-2 | 14500 | 74 | slight yellow | 100 | good | no | good |
| Comp. Example-1 | 1650 | 80 | none | 95 | good (but partially opaque) | no | bad (with partial spherulites) |
| Comp. Example-2 | 1700 | 39 | none | 96 | good (but partially opaque) | no | bad (with partial spherulites) |
| Comp. Example-3 | 1750 | 18 | none | 96 | opaque | no | bad (with partial spherulites) |
| Comp. Example-4 | 14400 | 47 | brown | 102 | good | light brown | good |

| | | | | Film | | | | |
|---|---|---|---|---|---|---|---|---|
| Sample No. | thickness ($\mu$) | strength (kg/mm$^2$) | elongation (%) | Young's modulus (kg/mm$^2$) | specific volume resistance ($\Omega$-cm) | dielectric constant | dielectric loss tangent | filament stretching ratio |
| Example-1 | 11 | 15 | 28 | 430 | $1 \times 10^{16}$ | 2.9 | $7 \times 10^{-4}$ | 5 |
| Example-2 | 18 | 16 | 37 | 420 | $1 \times 10^{16}$ | 3.0 | $15 \times 10^{-4}$ | 7 |
| Comp. Example-1 | 8 | 9 | 8 | 400 | $1 \times 10^{16}$ | 2.9 | $8 \times 10^{-4}$ | — |
| Comp. Example-2 | 8 | 10 | 9 | 400 | $8 \times 10^{14}$ | 3.1 | $15 \times 10^{-4}$ | — |
| Comp. Example-3 | 9 | 10 | 10 | 410 | $6 \times 10^{14}$ | 3.1 | $47 \times 10^{-4}$ | — |
| Comp. Example-4 | 16 | 16 | 33 | 420 | $7 \times 10^{15}$ | 2.9 | $15 \times 10^{-4}$ | 2.5 |

TABLE 3

| | Metal Compounds | | | | | $T_{c2}$ | $\Delta T_{c2}$ | $\Delta E$ | $\Delta(\Delta E)$ |
|---|---|---|---|---|---|---|---|---|---|
| | types | parts by weight | mol | $\eta^*$ (poise) | $\eta^*/\eta_0^*$ | (°C.) | (°C.) | kcal/mol | kcal/mol |
| Exam. 13 | Mg(OCH$_3$)$_2$ | 2 | 2.5 | 9200 | 4.6 | 228 | 14 | 22 | 15 |
| Exam. 14 | Mg(OC$_2$H$_5$)$_2$ | 2 | 1.8 | 5950 | 3.0 | 230 | 12 | 18 | 11 |
| Exam. 15 | Ba(OH)$_2$.8H$_2$O | 2 | 0.68 | 42400 | 21.2 | 204 | 38 | 33 | 26 |
| Exam. 16 | Ba(OH)$_2$.8H$_2$O | 5 | 1.7 | 70000 | 35.0 | 193 | 49 | 38 | 31 |
| Exam. 17 | BaO | 2 | 1.4 | 33200 | 16.6 | 207 | 35 | 31 | 24 |
| Exam. 18 | 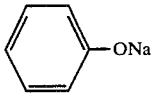 C$_6$H$_5$—ONa | 2 | 1.9 | 12000 | 6.0 | 215 | 27 | 23 | 16 |
| Comp. Examp. 8 | — | — | — | 2000 | 1 | 242 | — | 7 | — |
| Comp. Exam. 9 | Al(OH)$_3$ | 2 | 2.8 | 2600 | 1.3 | 236 | 6 | 8 | 1 |
| Comp. Exam. 10 | Al(OC$_2$H$_5$)$_3$ | 2 | 1.3 | 3400 | 1.7 | 234 | 8 | 8 | 1 |

Examples 19 through 20 and Comparative Examples 11 through 17

The procedure of Example 1 was repeated except that 5.152 kg of CaO and 5.643 kg of Na$_2$S.3H$_2$O were used to give PPS powder.

In a similar manner as in Example 1, the resulting PPS powder, 100 parts by weight, was blended as it is with various types of metal compounds, respectively, and each powder blend was extruded by means of a small extruder into pellets.

The value $\eta^*$ and other properties of these pellets are shown in Table 4.

The starting PAS in Examples 19 through 20 corresponds to the PAS of Comp. Example 11.

It can be seen from the results of Comp. Example 12 through 17 that the complex according to the present invention is not formed and the properties inherent to the present complex are not exhibited in the case where the metal compound used is not a strongly basic metal salt.

Example 21 and Comparative Examples 18 through 19

Polymerization and post-treatment were conducted as in Example 1 except that p-dichlorobenzene and m-dichlorobenzene were charged in a charging ratio of 97/3 (by weight) as the dichlorobenzene.

The resulting polymer powder having $\eta^*$ value of 1500 poise (Comp. Example 18) (specific surface area 210 m$^2$/g) 100 g, 500 g of NMP and 58 g of an NMP solution containing 4 g of NaOCH$_3$ dissolved therein were charged in an autoclave equipped with a stirrer and a thermometer and heated to 240° C. for 2 hours with stirring. The resulting mixture was placed in 3000 g of water to obtain a slurry.

A part of the slurry was sampled for electric conductivity-titration. It was found, as the result, that 0.13 mol of NaOCH$_3$ per 100 mols of the polymer unit has reacted with the polymer. The slurry was then dewatered, washed with water and dried to give a polymer complex (Example 21).

Incidentally, a heat-treated polymer (Comp. Example 19) was also prepared without addition of NaOCH$_3$ in the above procedure. The various properties of the polymers of Example 21 and Comp. Example 18 through 19 are shown in Table 5. In these examples, the starting polymers correspond to the polymer of Comp. Example 18.

TABLE 5

| | Metal Compounds | | | | | | $\Delta(\Delta E)$ |
|---|---|---|---|---|---|---|---|
| | types | parts by weight | mol | $\eta^*$ (poise) | $\eta^*/\eta_0^*$ | $\Delta T_{c2}$ (°C.) | kcal/mol |
| Exam. 21 | NaOCH$_3$ | 4 | 0.13 | 9000 | 6.0 | 18 | 15 |
| Comp. Exam. 18 | — | — | — | 1500 | — | — | — |
| Comp. Exam. 19 | — | — | — | 2000 | 1.3 | 3 | 0 |

TABLE 4

| | Metal Compounds | | | $\eta^*$ | | $T_{c2}$ | $\Delta T_{c2}$ | $\Delta E$ | $\Delta(\Delta E)$ |
|---|---|---|---|---|---|---|---|---|---|
| | types | parts by weight | mol | (poise) | $\eta^*/\eta_0^*$ | (°C.) | (°C.) | kcal/mol | kcal/mol |
| Exam. 19 | Ca(OH)$_2$ | 2 | 2.9 | 17000 | 5.8 | 218 | 23 | 26 | 19 |
| Exam. 20 | Li(OH).H$_2$O | 2 | 5.1 | 9200 | 3.1 | 221 | 20 | 22 | 15 |
| Comp. Exam. 11 | — | | | 2950 | 1 | 241 | — | 7 | — |
| Comp. Exam. 12 | CaCO$_3$ | 2 | — | 5000 | 1.7 | 233 | 8 | 8 | 1 |
| Comp. Exam. 13 | BaCO$_3$ | 2 | — | 4500 | 1.5 | 234 | 7 | 7 | 0 |
| Comp. Exam. 14 | Na$_2$CO$_3$ | 2 | — | 5100 | 1.7 | 232 | 9 | 8 | 1 |
| Comp. Exam. 15 | ZnO | 2 | — | 3200 | 1.1 | 237 | 4 | 7 | 0 |
| Comp. Exam. 16 | CH$_3$COOLi.2H$_2$O | 2 | — | 3600 | 1.2 | 233 | 8 | 7 | 0 |
| Comp. Exam. 17 | (CH$_3$COO)$_2$Ca.H$_2$O | 2 | — | 3900 | 1.3 | 232 | 9 | 8 | 1 |

Example 22 and Comp. Example 20

In a 3-liter autoclave equipped with a stirrer and a thermometer were charged 511.57 g of Na$_2$S.3H$_2$O, 1.6 g of NaOH, 1000 g of NMP, 204 g of lithium acetate dihydrate and 36 g of H$_2$O and the reaction system was heated to about 200° C. in the stream of N$_2$ to remove water therefrom; water and NMP in a total amount of 288 g were distilled away. To this autoclave were added 588.04 g of p-dichlorobenzene and 400 g of NMP, and polymerization was effected at 245° C. for 20 hours. After termination of the polymerization, the resulting polymer was filtered off, washed with water and hot water, and then dried to give 375 g of powdery poly-p-phenylene sulfide.

The resulting PPS powder, 100 parts by weight, was blended as it is with 2 parts by weight of dosium methoxide and the powder blend was extruded twice by means of an extruder. Incidentally, the temperature of the resin during the extrusion was 320° C. The resulting complex had $\eta^*$ value of 6200 poise. The properties of the starting PPS without sodium methoxide are shown as Comp. Example 20 in Table 6 together with those of the complex.

TABLE 6

| | Metal Compounds | | | | | $T_g$ | $T_{c1}$ | $T_{c2}$ | $\Delta T_{c2}$ | $\Delta E$ kcal/ | $\Delta(\Delta E)$ kcal/ | $T_p$ |
|---|---|---|---|---|---|---|---|---|---|---|---|---|
| | types | parts by weight | mol % | $\eta^*$ | $\eta^*/\eta_0^*$ | (°C.) | (°C.) | (°C.) | (°C.) | mol | mol | % |
| Example 22 | NaOCH$_3$ | 2.0 | 4.0 | 6200 | 3.5 | 94 | 136 | 224 | 17 | 25 | 18 | 75 |
| Comp. Example 20 | — | — | — | 1750 | 1 | 91 | 134 | 241 | — | 7 | — | 82 |

What is claimed is:

1. A process for producing a polyarylenesulfide complex having the properties as defined in (A) through (C) below, which comprises reacting a polyarylenesulfide with 0.05 to 20 miles of at least one strongly basic metal compound selected from the group consisting of a hydroxide of an alkaline earth metal, an oxide of an alkaline earth metal and a hydrocarbyloxide of an alkali metal per 100 mols of arylenesulfide groups contained in the polyarylenesulfide said reaction being conducted with the polyarylenesulfide in the molten state at a temperature from its melting point to 400° C. and in the substantial absence of a liquid dispersant:

(A) $\eta^*/\eta_o^* = 3$ to 100, wherein the $\eta^*$ and $\eta_o^*$ stand for melt viscosities of the complex and the starting polyarylenesulfide, respectively;

(B) $\Delta T_{c2} = (T_{c2})_0 - T_{c2} = 10°$ to 100° C., wherein $T_{c2}$ and $(T_{c2})_0$ stand for crystallization temperatures of the complex and the starting polyarylenesulfide, respectively, observed when the polyarylenesulfide is cooled from its molten state; and (C) $\Delta(\Delta E) = \Delta E - (\Delta E)_0 = 5$ to 75 kcal/mol, wherein $\Delta E$ and $(\Delta E)_0$ stand for apparant flow activation energies of the complex and the starting polyarylenesulfide, respectively.

2. The process according to claim 1, in which the polyarylenesulfide is a polyphenylenesulfide comprising 90% by mol or more of paraphenylenesulfide units.

3. A formed product made from a resin consisting essentially of a polyarylenesulfide complex produced by reacting a polyarylenesulfide with 0.05 to 20 mols of at least one strongly basic metal compound selected from the group consisting of a hydroxide of an alkaline earth metal, an oxide of an alkaline earth metal and a hydrocarbyloxide of an alkali metal per 100 mols of arylenesulfide groups contained in the polyarylenesulfide said reaction being conducted with the polyarylenesulfide in the molten state at a temperature from its melting point to 400° C. and in the substantial absence of a liquid dispersant, said polyarylenesulfide complex having the properties defined in (A) through (C) below:

(A) $\eta^*/\eta_o^* = 3$ to 100, wherein the $\eta^*$ and $\eta_o^*$ stand for melt viscosities of the complex and the starting polyarylenesulfide, respectively;

(B) $T_{c2} = (T_{c2})_0 - T_{c2} = 10°$ to 100° C., wherein $T_{c2}$ and $(T_{c2})_0$ stand for crystallization temperatures of the complex and the starting polyarylenesulfide, respectively, observed when the polyarylenesulfide is cooled from its molten state; and (C) $\Delta(\Delta E) = \Delta E - (\Delta E)_0 = 5$ to 75 kcal/mol, wherein $\Delta E$ and $(\Delta E)_0$ stand for apparent flow activation energies of the complex and the starting polyarylenesulfide, respectively.

4. A formed product according to claim 3 wherein the product is in the form of a film or a fiber.

* * * * *